United States Patent

[11] 3,601,083

[72] Inventor Clifford Douglas Stone
 Plantation, Fla.
[21] Appl. No. 810,165
[22] Filed Mar. 25, 1969
[45] Patented Aug. 24, 1971
[73] Assignee Airpax Electronics, Inc.
 Fort Lauderdale, Fla.

[54] SET POINT INDICATOR
 6 Claims, 5 Drawing Figs.
[52] U.S. Cl. ............................................... 116/115,
 219/506, 338/79
[51] Int. Cl. ............................................... G01p 13/00
[50] Field of Search........................................... 116/115,
 124, 133, 115.5; 13/20, 24, 25; 219/109, 487, 505;
 323/22; 318/28, 143, 184; 338/71, 79, 143;
 235/95, 103; 73/362, 362 R

[56] References Cited
UNITED STATES PATENTS

| | | | |
|---|---|---|---|
| 2,654,062 | 9/1953 | Burdick.......................... | 116/124.1 X |
| 2,860,215 | 11/1958 | Williams........................ | 338/79 |
| 2,979,258 | 4/1961 | Van Alen ....................... | 235/95 |
| 3,067,935 | 12/1962 | Gordon .......................... | 235/103 |
| 3,117,448 | 1/1964 | Gilmont et al. ................ | 73/362 R |
| 3,202,127 | 8/1965 | Struble et al................... | 116/115 |
| 3,402,693 | 9/1968 | Tweed et al. .................. | 116/115 |

Primary Examiner—Louis J. Capozi
Attorney—Le Blanc & Shur

ABSTRACT: Disclosed is a combination electrical control device and indicator particularly adapted for use as a set point indicator for a furnace controller. The unit comprises a potentiometer and digital counter coupled by a gear train to a manually adjustable control knob. One of the gears of the gear train is releasably mounted so that the reference point of the counter can be readily adjusted to indicate different temperature ranges.

Patented Aug. 24, 1971
3,601,083
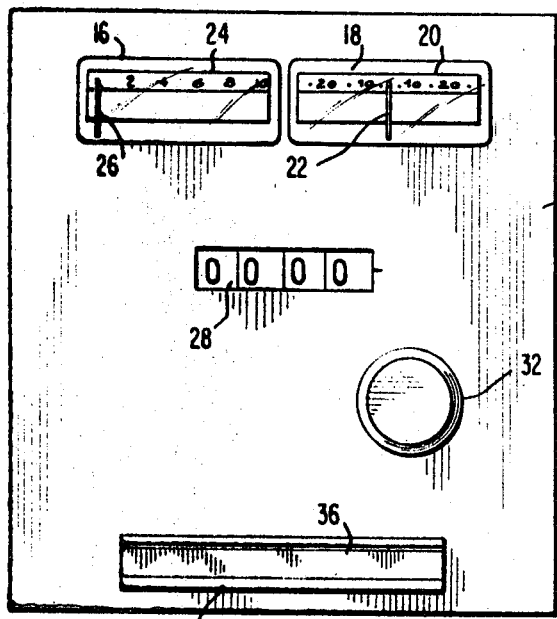
FIG.1
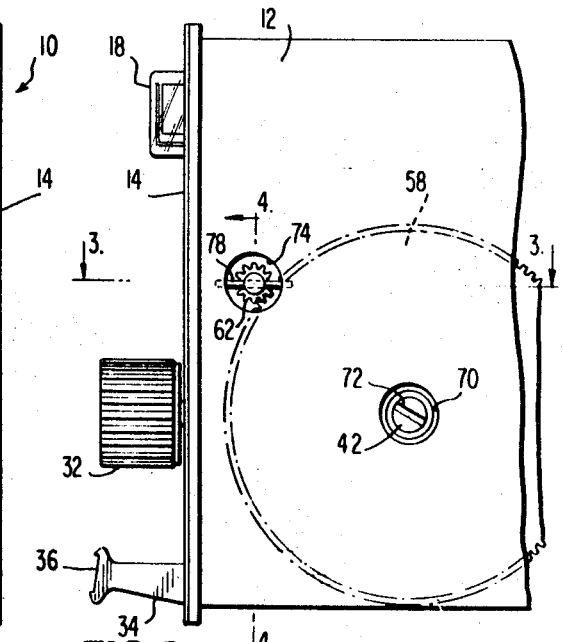
FIG.2
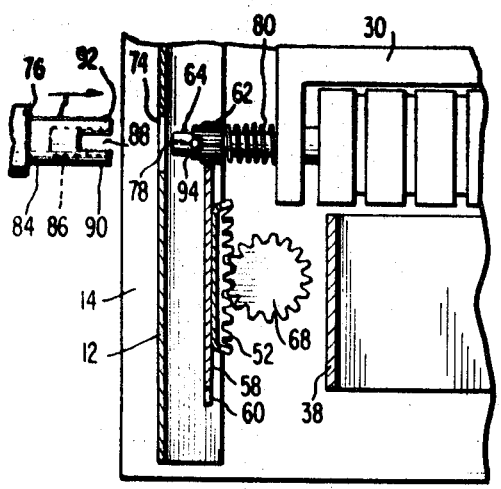
FIG.4
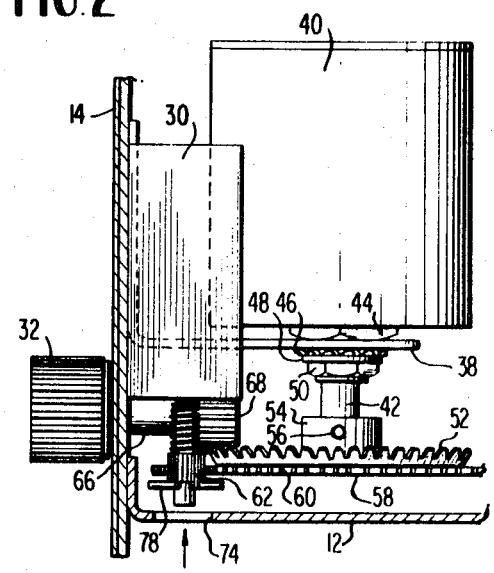
FIG.3
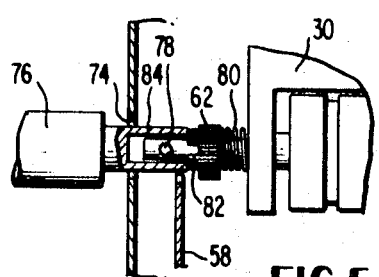
FIG.5
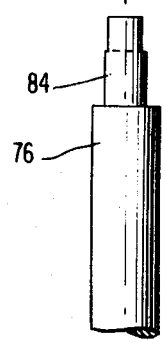
INVENTOR
CLIFFORD D. STONE
BY  *Le Blanc & Shur*
ATTORNEYS

SET POINT INDICATOR

This invention relates to a combination electrical control device and indicating mechanism and more particularly to a variable potentiometer and temperature indicator called a set point indicator in which the indicator range may be readily and simply adjusted in relation to the position of the wiper arm of the potentiometer. The device is particularly adapted for use in an electrical controller for controlling electrical power supplied to one or more heating elements of an electrical furnace.

Electrical controllers are well known and are customarily used in conjunction with power modules to vary the flow of heating current to an electrical furnace so as to maintain predetermined temperature conditions within the furnace. In systems of this type, a microvolt signal from a suitable temperature sensor such as a thermocouple is compared to a very stable reference supply referred to as the set point. The error signal is amplified by a low level DC magnetic amplifier and displayed as the deviation from set point. The amplified error signal is further amplified and conditioned in the controller to account for the dynamics of the process before it appears as the controller output signal. The controller output signal feeds a power module which proportions electrical power to the heating elements of a furnace by firing silicon controlled rectifiers. A system of this type is shown and described in assignee's copending application, Ser. No. 782,243 filed Dec. 9, 1968, the disclosure of which is incorporated herein by reference.

Previously available incrementally controlled recording mechanism have failed to provide a simplified arrangement for setting the indicator to a certain reference point in relation to a variable control element such as a variable resistor or a potentiometer. That is, controls of this nature have been found to be lacking in precision and simplicity of adjustment desirable for electrical control equipment.

The present invention overcomes these difficulties by providing a control and display device which is capable of controlling a potentiometer and indicating the result of this control on a connected indicator to a degree of accuracy far greater and at a minimum of cost as compared with prior devices. Readout adjustment of the indicator in relation to the resistance of the potentiometer may be accomplished faster and with greater accuracy than in any known control of the same or similar nature.

Specifically, the device of the present invention makes it possible to provide an arrangement for setting an indicator to a certain reference point in relation to a given amount of resistance in a potentiometer by establishing the ratio of turns of an adjusting knob to the total number of turns available in the potentiometer. This is accomplished through a simplified and readily adjustable train of gears which causes a change in resistance to vary the action of the associated circuitry to maintain a predetermined temperature in the furnace. It permits a resistance to be varied in such a way as to activate circuitry controlling the temperature of an oven to an accuracy of one-half of a degree centigrade or better and this may be observed on an indicator provided in conjunction with the control knob and the potentiometer through the gear train. In addition, a very rapid adjustment of the set point indicator may be affected through the use of a spring-loaded pinion located in the indicator shaft.

In the preferred embodiment, the set point indicator takes the form of a variable potentiometer and a four-digit counter in which a pinion is mounted on the shaft of the counter and retained on the shaft by a loading spring which forces the pinion against a pin extending through the counter shaft. This action of the spring causes notches in the pinion to engage the pin and prevent rotation of the pinion on the counter shaft until such time as the pinion is forced away from the pin allowing the pinion to turn on the shaft so as to make possible simple and rapid adjustment of the relation between the indicator and the potentiometer shaft.

Located on the potentiometer shaft is a spur gear meshing with the pinion of the indicator preferably with a ratio of 10 to 1. Fastened to the inboard side of this spur gear is a crown gear which meshes with a pinion gear in turn connected to the control knob. This configuration of gears is preferably set at a 4 to 1 ratio.

Thus the control knob on the panel controls the pinion engaging the crown gear which is mounted on the spur gear. This in turn mates with the pinion of the indicator shaft. The combination spur and crown gear being mounted on the potentiometer shaft in train with the control knob pinion allow a 10 to 1 ratio from the control knob to the potentiometer shaft with infinite control to the potentiometer shaft with indicator increments of 0.2° C. control.

It is therefore one object of the present invention to provide an improved electrical control and indicating device.

Another object of the present invention is to provide an improved set point indicator mechanism for furnace controllers.

Another object of the present invention is to provide an improved device for indicating the position of a variable electrical element such as a potentiometer.

Another object of the present invention is to provide a combination control and indicating device incorporating a simplified and inexpensive arrangement for readily adjusting the reference point of the indicator in relation to the position of the control element.

Another object of the present invention is to provide an improved set point controller and indicator device having a simplified gear train for interconnecting the controller and the indicating mechanism of the unit. These and further objects and advantages of the invention will be more apparent upon reference to the following specifications, claims and appended drawings wherein:

FIG. 1 is a front elevational view of a set point indicator constructed in accordance with the present invention;

FIG. 2 is a partial side view of the set point indicator of FIG. 1 with portions broken away for the sake of clarity;

FIG. 3 is a cross section through the set point indicator taken along line 3—3 of FIG. 2;

FIG. 4 is a cross section taken along line 4—4 of FIG. 4; and

FIG. 5 is a partial cross section similar to FIG. 4, illustrating application of a tool to a pinion of a gear train for quickly changing the reference point of the counter.

Referring to the drawings, the novel set point indicator of the present invention is generally indicated at 10 in FIG. 1 and comprises a generally rectangular housing 12 including a faceplate 14. Mounted in suitable appertures in faceplate 14 are a pair of meters 16 and 18, the former for displaying power output and the latter displaying temperature deviation in degrees centigrade. That is, the set point indicator 10 of the present invention is adapted to be mounted at the bottom of a controller of the type disclosed in the aforementioned copending application, Ser. No. 782,243, which controller in combination with a power module is constructed to control the temperature of one or more heating elements in a furnace. The overall system is constructed primarily for temperature control of diffusion and conveyor furnaces in which a power module uses a controller signal to proportion electrical power for driving the heating elements. The controller accepts various range cards to set up different temperature ranges and provide cold junction compensation for a different thermocouple. The microvolt signal from the thermocouple is compared to a very stable reference supply called the set point which is established by unit 10 of the present invention. The error signal is amplifier by a low level DC magnetic amplifier and displayed as deviation from the set point. This deviation is displayed by meter 18. Meter 18 is a zero center meter including suitable indicia 20 calibrated in degrees centigrade and a movable pointer or indicator 22 which cooperates with indicia 20 to display the temperature deviation of the furnace as sensed by a thermocouple from the set point determined by unit 10. Above center deflection of pointer 22 indicates over temperature and full scale deflection is preferably ± 25° C.

Meter 16 similarly includes indicia 24 and cooperating movable pointer or indicator 26. Meter 16 is an output meter and displays the power output over the range from 0 to 100 percent. Full scale deflection indicates that 100 percent power output is being supplied by the power module to the heating element or elements of the furnace.

Displayed through an aperture or window 28 near the center of faceplate 14 are the four digit wheels of a four-digit counter 30 mounted within housing 12. Counter 30 is adapted to be manually adjusted so as to vary the digital count displayed through window 28 by manual rotation of a control knob 32 connected to a shaft passing through faceplate 14 and mechanically coupled to the counter 30. Finally, mounted on the faceplate 14 near its lower edge is a handle 34 provided with a dovetailed groove 36 adapted to receive a range indicating card or a range label for a purpose more fully described below.

As best seen in FIG. 3, mounted within housing 12 by an L-shaped bracket 38 is an electrical potentiometer 40 the resistance of which is varied by rotating the potentiometer shaft 42. Potentiometer 40 is provided with a stepped end plate 44 which carrier a bearing rotatably mounted shaft 42 and the potentiometer is secured to bracket 38 by a lock washer 46, plain washer 48 and a nut 50 threaded over the projecting portion of end plate 44.

Mounted on the end of potentiometer shaft 42 is a crown gear 52 which has an integral hub 54 attached to shaft 42 by a pair of diametrically opposite setscrews, one of which is illustrated in FIG. 3 at 56. Attached to crown gear 52 by rivets and rotatable with it is a spur gear 58 having peripheral teeth 60. The teeth 60 of spur gear 58 mesh with the teeth of a pinion 62 mounted for rotation with counter shaft 64. Control knob 32 is connected to a shaft rotatably mounted in bearing 66 ( FIG. 3) secured to the housing and the end of this shaft carries a control knob pinion 68 having teeth which mesh with the teeth of crown gear 52.

Operation of the gear train is as follows. When knob 32 is rotated, this rotates control pinion 68 which meshes with crown gear 52 to rotate shaft 42 and vary the resistance of potentiometer 40. The potentiometer 40 and the meters 16 and 18 are connected by suitable leads (not shown) to the circuitry of the controller and power module such that variation in the resistance of potentiometer 40 varies the output signal from the controller and therefore the amount of power supplied to the heating element of a furnace. At the same time, spur gear 58 rotates with crown gear 52 and in meshing with the teeth of pinion 62 rotates counter shaft 64 to vary the count displayed through window 28. The indicia on the counter wheels are calibrated in degrees centigrade so that the position of knob 32 varies the resistance of potentiometer 40 and the count in counter 30 such that the counter displays the temperature set into the system by the amount of resistance in potentiometer 40.

In utilizing the set point indicator it is often desirable to vary the range of indication of the counter in relation to the amount of resistance in potentiometer 40. For example, the four wheel counter 30 illustrated provides a range of 1,000° C. and in some instances it may be desirable to provide a range from 0 to 1,000° and in other instances a different range such as 350 to 1,350° C. for the temperature range of the furnace. This may be simply accomplished in the set point indicator of the present invention by performing the following steps.

1. Turn the set point knob 32 to its extreme counter clockwise position as viewed from the front of the unit.

2. Remove the housing backplate which may be accomplished by loosening four screws at the rear of the unit.

3. Loosen the two setscrews in the hub 54 of the crown gear using a 1/16 (No. 6) Allen wrench.

4. Hold the potentiometer shaft from rotating. This is accomplished by inserting the end of the screwdriver into the aperture 70 (FIGURE 2) in the sidewall of the housing 12. The end of shaft 42 is slotted as at 72 so that the shaft can be held from rotating by a screwdriver inserted through aperture 70 into slot 72 in the end of the shaft. With shaft 42 held against rotating, the crown gear 42 is slid along the shaft free of pinion 68 and the spur gear 58 is turned on the shaft rotating pinion 62 and changing the count in the counter 30 until the desired count is reached. For a range of from 350° C. to 1,350° C. spur gear 58 is rotated until the counter indicates the number 350 through window 28.

5. Reposition gears 52 and 58 along the shaft and tighten the set screws on the gear hub 56. If the mechanism does not turn smoothly, loosen the set screws and move the crown gear slightly away from the knob gear 68. Reassemble the front plate to the housing.

6. Install a range label into the slot 36 on the handle 34 indicating that the range on the set point indicator is now from 350° C. to 1,350° C.

An important feature of the present invention resides in the fact that it includes an arrangement for even more simply and quickly changing the range of the indicator. For this purpose, the wall of housing 12 is provided with a second hole or aperture 74 adapted to receive the end of a special tool 76 (FIGURE 3) designed for this purpose. In order to permit rapid adjustment of the range, counter pinion 62 is loosely mounted on countershaft 64 but is urged against a transverse pin 78 which passes through shaft 64 with a friction fit. The pinion 62 is urged against pin 78 by a compression spring 80. Pinion 64 is provided with slots such as slot 82 in FIGURE 5 adapted to receive the ends of pin 78. Only two slots 82 on opposite sides of pinion 62 are necessary for receiving pin 78 but in the preferred embodiment the pinion 62 is provided with four slots 86 spaced 90° about the rotational axis of the pinion. Thus, with spring 80 urging the pinion toward transverse pin 78 the ends of this pin are received into cooperating slots 82 and pinion 62 is restrained so that it rotates with counter shaft 64.

Tool 76 is provided with a hollow, reduced diameter end 84 sufficiently small that it will pass through aperture 74 in the housing. The reduced end 84 is hollowed or drilled out as at 86 to a sufficient diameter to pass over the end of shaft 64. Finally, the extreme end portion of tool tip 84 is provided with a transverse slot 88 such that the tool presents the bifurcations or spaced tips 90 and 92 which slip over the ends of pin 78 and engage the edges 94 of the pinion 62 to drive the pinion free of pin 78 and compress spring 80. FIGURES 3 and 4 show the tool adjacent set point indicator 10 with pinion 62 engaging the teeth 60 of spur gear 58. In FIGURE 5, the tool has been inserted through aperture 74 and the spring compressed to move pinion 62 along shaft 64 so that its teeth no longer engage the teeth of spur gear 58.

In modifying the range — potentiometer position relationship utilizing tool 76, control knob 34 is again first rotated to its most counterclockwise position. The end 84 of tool 76 is then inserted through aperture 74 and spring 80 compressed until pinion 62 is free of spur gear 58.

Tool 76 is then manually rotated and bifurcations 90 and 92 engage the ends of pin 78 to cause shaft 64 to correspondingly rotate. The tool is rotated with the spring compressed until the desired count (such as 350 degrees centigrade) appears through window 28. When the tool is withdrawn and the spring released the spring 80 urges pinion 82 back into engagement with pin 78 and its teeth again mesh with the teeth of spur gear 58.

One advantage provided by the movable pinion 62 lies in the fact that the range can be very rapidly adjusted and can be done so from externally of the housing without separating the housing and faceplate by simply inserting hand tool 76 through the aperture 74 in the side wall of the housing. Spring 80 is compressed and tool 76 is simply rotated to reset the counter to a new position.

It is apparent from the above that the present invention provides an improved set point indicator in which the control knob, counter and potentiometer are interconnected by a simplified, inexpensive and reliable gear train mechanism. An important feature of the present invention resides in the ease and simplicity with which the indication of the counter can be changed in relation to the setting of the potentiometer making it quite easy to change the indicator range of the unit. The mechanism makes it possible to vary the resistance to activate oven temperature control circuitry to an accuracy of one-half of a degree centigrade or better and this is observed on the counter through window 28. In the preferred embodiment, the spur gear mates with the indicator pinion 62 with a ratio of 10 to 1. Likewise, in the preferred embodiment, the crown gear is mated to the control knob pinion 68 by a ratio of 4 to 1. This allows a 10 to 1 ratio from the control knob to the potentiometer shaft with infinite control to the potentiometer shaft with indicator increments of 0.2° C. control.

While the set point indicator has been described as used in conjunction with a furnace controller and power module, the mechanism of the present invention is adapted to all types of variable element control and indicator mechanisms. Important features of the invention include the fact that the unit is constructed for ease of mounting in almost any position on the controller housing and is completely self contained so that it may be remotely mounted and simply connected to the controller and power module by appropriate lead wires.

What is claimed and desired to be secured by United States Letters Patent is:

1. A set point indicator comprising a housing including a faceplate, an electrical potentiometer mounted in said housing and having a rotary shaft, a crown gear and a spur gear rotatable with said potentiometer shaft, a digital counter mounted in said housing and having a plurality of indicia wheels visible through a window in said faceplate, said digital counter having a rotary shaft, a pinion rotatable with said counter shaft and having teeth meshing with said spur gear, a control knob mounted on said faceplate and adapted to be manually rotated, and a second pinion rotatable with said control knob and having teeth meshing with said crown gear whereby manual operation of said control knob acts through said pinions and gears to rotate said shafts and simultaneously vary said potentiometer and counter.

2. A set point indicator according to claim 1 including a power output meter and a temperature deviation meter mounted in said faceplate.

3. A set point indicator according to claim 1 wherein said counter is calibrated in degrees centigrade.

4. A set point indicator according to claim 1 wherein said gears are connected to a hub slidable on said potentiometer shaft, at least one set screw releasably securing said hub to said shaft, said housing including an aperture adjacent to the end of said potentiometer shaft for insertion of a tool into said housing to restrain said potentiometer shaft against rotation.

5. A set point indicator according to claim 1 wherein said counter pinion is slidable on said counter shaft, a pin passing through said shaft, and a spring resiliently urging said pinion against said pin.

6. A set point indicator according to claim 5 wherein said pinion is provided with diametrically opposed slots adapted to slidably receive the ends of said pin.